US012565222B2

(12) United States Patent
Park et al.

(10) Patent No.: US 12,565,222 B2
(45) Date of Patent: Mar. 3, 2026

(54) ELECTRONIC CONTROL SYSTEM, DEVICE, AND METHOD

(71) Applicant: HL KLEMOVE CORP., Incheon (KR)

(72) Inventors: Jong Gyu Park, Yongin-si (KR); HanYeol Yu, Suwon-si (KR); Hyeon Dong Cho, Seongnamsi (KR)

(73) Assignee: HL KLEMOVE CORP., Incheon (KR)

( * ) Notice: Subject to any disclaimer, the term of this patent is extended or adjusted under 35 U.S.C. 154(b) by 434 days.

(21) Appl. No.: 17/505,858

(22) Filed: Oct. 20, 2021

(65) Prior Publication Data

US 2022/0118990 A1     Apr. 21, 2022

(30) Foreign Application Priority Data

Oct. 20, 2020     (KR) ........................ 10-2020-0136190

(51) Int. Cl.
B60W 50/02          (2012.01)
B60R 16/023         (2006.01)
B60W 50/04          (2006.01)

(52) U.S. Cl.
CPC ....... B60W 50/0205 (2013.01); B60R 16/023 (2013.01); B60W 50/04 (2013.01); (Continued)

(58) Field of Classification Search
CPC ...... B60W 50/00; B60W 50/02; B60W 50/04; B60W 50/0205; B60W 2050/021; B60W 2050/0215; B60W 2050/0001; B60W 2050/0002; B60W 2050/0004; B60W 2050/0005; B60R 16/00; B60R 16/02; (Continued)

(56) References Cited

U.S. PATENT DOCUMENTS

2014/0108896 A1*   4/2014   Jung ................... G06F 11/0796
                                                              714/819
2018/0046161 A1*   2/2018   Yhr ......................... G05B 9/03
                              (Continued)

FOREIGN PATENT DOCUMENTS

JP           2020-30808 A      2/2020
KR      10-2010-0060111 A      6/2010
                     (Continued)

OTHER PUBLICATIONS

Office Action issued on May 27, 2024, for corresponding Korean Patent Application No. 10-2020-0136190, along with an English machine translation (10 pages).

(Continued)

*Primary Examiner* — Khoi H Tran
*Assistant Examiner* — Sarah A Tran
(74) *Attorney, Agent, or Firm* — Hauptman Ham, LLP

(57)          ABSTRACT

The disclosure relates to an electronic control system, device, and method. Specifically, according to the disclosure, an electronic control device comprises a transceiver receiving, from a sensor, raw data and a first error detection result obtained by performing a first error detection logic on the raw data, a detector obtaining a second error detection result by performing a second error detection logic on the raw data, and a comparator determining whether a sensor channel included in the sensor is faulty based on the first error detection result and the second error detection result.

18 Claims, 8 Drawing Sheets

(52) U.S. Cl.
CPC ................. *B60W 2050/021* (2013.01); *B60W 2050/0215* (2013.01)

(58) Field of Classification Search
CPC .............. B60R 16/023; B60Y 2306/00; B60Y 2306/15; B60Y 2400/00; B60Y 2400/30
See application file for complete search history.

(56)                    References Cited

U.S. PATENT DOCUMENTS

2021/0070321 A1     3/2021   Serizawa et al.
2022/0089179 A1*   3/2022   Sakamoto ............. G01S 13/865

FOREIGN PATENT DOCUMENTS

WO          2019/176603 A1    9/2019
WO          2020/166253 A1    8/2020

OTHER PUBLICATIONS

Korean Notice of Allowance issued on May 19, 2025, in connection with the Korean Patent Application No. 10-2020-0136190, with its English translation, 2 pages.

* cited by examiner

1

10

20

20

| | |
|---|---|
| sensor channel | ⟋210 |
| processor | ⟋220 |
| LVDS | ⟋230 |
| GPIO / INT | ⟋240 |
| SPI / I2C | ⟋250 |

<u>310</u>

ELECTRONIC CONTROL SYSTEM, DEVICE, AND METHOD

CROSS-REFERENCE TO RELATED APPLICATION

This application claims priority from Korean Patent Application No. 10-2020-0136190, filed on Oct. 20, 2020, which is hereby incorporated by reference for all purposes as if fully set forth herein.

BACKGROUND

Field

The disclosure relates to an electronic control system, device, and method, and more specifically, to an electronic control system, device, and method for determining integrity of raw data.

Description of Related Art

Many advanced driver assistance systems (ADASs) for controlling a vehicle using a radar device for detecting surrounding objects have been recently developed. In order for such driver assistance system to perform accurate vehicle control, accurate object detection by the radar device is required.

As driver assistance systems are commercialized, the importance of automotive safety integrity level (ASIL)-related activities to operate them safely is increasing. Sensors, such as lidar, radar, cameras, and ultrasonic sensors, play a key role in providing driver safety functions.

Meanwhile, if sensor information is corrupted or if loss or distortion occurs during data transfer, the driver safety function cannot perform its role. Thus, it is essential to maintain the reliability of sensor information.

Accordingly, there is a need for a method for determining the integrity of sensor data.

BRIEF SUMMARY

In the background, there is provided an electronic control system, device, and method for determining the integrity of raw data by comparing the result of detecting an error in raw data inside a sensor with the result of obtaining the received raw data by the electronic control device.

To achieve the foregoing objectives, according to an aspect of the disclosure, there is provided an electronic control device comprises a transceiver receiving, from a sensor, raw data and a first error detection result obtained by performing a first error detection logic on the raw data, a detector obtaining a second error detection result by performing a second error detection logic on the raw data, and a comparator determining whether a sensor channel included in the sensor is faulty based on the first error detection result and the second error detection result.

According to another aspect of the disclosure, there is provided an electronic control method may comprise a reception step receiving, from a sensor, raw data and a first error detection result obtained by performing a first error detection logic on the raw data, a detection step obtaining a second error detection result by performing a second error detection logic on the raw data, and a comparison step determining whether a sensor channel included in the sensor is faulty based on the first error detection result and the second error detection result.

According to another aspect of the disclosure, there is provided an electronic control system comprising a sensor performing a first error detection logic on raw data, which is a result of sensing, to obtain a first error detection result and an electronic control device receiving the raw data and the first error detection result, performing a second error detection logic on the raw data to obtain a second error detection result, and determining whether a sensor channel included in the sensor is faulty based on the first error detection result and the second error detection result.

According to the disclosure, the electronic control system, device, and method may enhance the reliability of raw data by comparing the result of detecting an error in raw data by the electronic control device with the result of detecting an error in raw data by a sensor.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
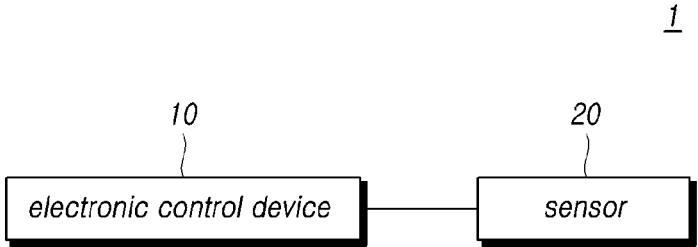
FIG. 1 is a block diagram illustrating an electronic control system according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, an electronic control device according to an embodiment of the disclosure is described with reference to the accompanying drawings.

FIG. 1 is a block diagram illustrating an electronic control system 1 according to an embodiment.

Referring to FIG. 1, according to embodiments, the electronic control system 1 may include a sensor 20 and an electronic control device 10.

The electronic control system 1 may determine whether a sensor channel 210 is faulty by comparing a first error detection result, obtained by performing a first error detection logic on raw data generated by the sensor 20, with a second error detection result, obtained by performing a second error detection logic on the raw data.

Specifically, an electronic control system 1 may include a sensor 20 performing a first error detection logic on raw data, which is a result of sensing, to obtain a first error detection result and an electronic control device receiving the raw data and the first error detection result, performing a second error detection logic on the raw data to obtain a second error detection result, and determining whether a sensor channel included in the sensor 20 is faulty based on the first error detection result and the second error detection result.

The sensor 20 is a component that detects, classifies, and measures physical quantities, such as of heat, light, temperature, pressure, and sound, or changes therein and indicates them by way of a predetermined signal. The sensor 30 is not limited to a specific sensor 20, such as a radar sensor, vehicle speed sensor, torque sensor, steering angle sensor, rack position sensor, location sensor, or image sensor.

The sensor 20 may generate raw data, which is a result of sensing, by detecting the movement, sound, pressure, or heat of a specific object. The sensor 20 may obtain the first error detection result by performing the first error detection logic to determine the integrity of the generated raw data. The sensor 20 may transmit the first error detection result, together with the raw data, to the electronic control device 10 to compare the obtained first error detection result with a second error detection result described below. The raw data may be data in the form of an image or data in the form of a radar signal received through an antenna, depending on the type of the sensor 20.

The electronic control device 10 may receive the raw data from the sensor 20 to perform the second error detection logic. The electronic control device 10 may perform the second error detection logic to determine the integrity of the raw data and may yield the second error detection result. The electronic control device 10 may receive the first error detection result from the sensor 20 and may compare it with the second error detection result to double-determine the integrity of the raw data.

The first error detection logic and the second error detection logic may be configured to yield an error detection result by the same error detection procedure.

The electronic control device 10 may receives whether the sensor channel is faulty through a general purpose input output (GPIO)/interrupt (INT) signal.

The electronic control device 10 may perform a third error detection logic and determine whether the sensor channel is faulty based on the third error detection logic, if the first error detection result is Fail and the second error detection result is Pass.

As described above, the electronic control system 1 may enhance the accuracy of the raw data by comparing the first error detection result, which is a result of performing the first error detection logic on the raw data by the sensor 20, with the second error detection result, which is a result of performing the second error detection logic on the raw data by the electronic control device 10.

Figure 2:
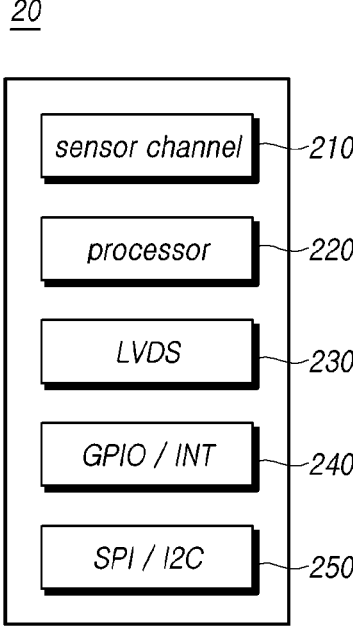
FIG. 2 is a block diagram specifically illustrating a sensor according to an embodiment.

FIG. 2 is a block diagram specifically illustrating a sensor 20 according to an embodiment.

Referring to FIG. 2, the sensor 20 may include a sensor channel 210, a processor 220, a low voltage differential signaling (LVDS) 230, a general purpose input output (GPIO)/interrupt (INT) 240, and a serial peripheral interface (SPI)/inter-integrated circuit (I2C) 250.

The sensor channel 210 may output raw data that is a result of detecting an object according to the usage of the sensor 20. When there are a plurality of sensor channels 210, raw data may be output from each sensor channel 210. In this case, the raw data described in the disclosure may refer to the entire raw data output from each sensor channel 210.

The processor 220 may include at least one core. In particular, if the at least one core includes a plurality of cores, at least one of the plurality of cores may include a lockstep core.

The processor 220 may obtain the first error detection result by performing the first error detection logic on the raw data output from the sensor channel 210. Specifically, the processor 220 may determine, based on the raw data, whether a specific channel or all channels among the sensor channels 210 outputting the raw data malfunction.

The LVDS 230 may transmit the raw data to the electronic control device 10. The LVDS 230 may transmit the raw data to the electronic control device 10 when the raw data exceeds a predetermined amount of data or periodically according to a preset cycle irrespective of the amount of data. Or, the LVDS 230 may the raw data to the electronic control device 10 immediately when it is received.

The GPIO/INT 240 may transmit a signal regarding whether the sensor 20 is abnormal, such as an error in the sensor 20, to the electronic control device 10. Such a signal may be periodically transmitted according to a preset period. The GPIO/INT 240 may transmit an error signal to the electronic control device 10 whenever an error occurs in the sensor 20.

The GPIO/INT 240 may transmit the first error detection result of the raw data determined by the processor 220 to the electronic control device 10.

The SPI/I2C 250 may receive setting information of the sensor 20 generated by the electronic control device 10. Here, the setting information of the sensor 20 may include, but is not limited to, the detection cycle of the sensor 20, ON/OFF for each channel included in the sensor 20, and the detection radius of the sensor 20.

The electronic control device 10 described below is the same as the electronic control device 10 included in the electronic control system 1. No duplicate description is given below in describing the electronic control device 10.

Figure 3:
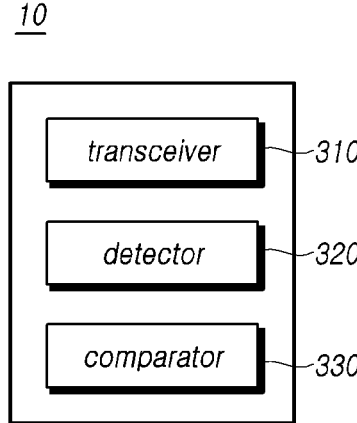
FIG. 3 is a block diagram illustrating an electronic control device according to an embodiment of the disclosure.

FIG. 3 is a block diagram illustrating an electronic control device 10 according to an embodiment of the disclosure.

Referring to FIG. 3, the electronic control device 10 may include a transceiver 310, a detector 320, and a comparator 330.

An electronic control device 10 may comprise a transceiver 310 receiving, from a sensor 20, raw data and a first error detection result obtained by performing a first error detection logic on the raw data, a detector 320 obtaining a second error detection result by performing a second error detection logic on the raw data, and a comparator 330 determining whether a sensor channel 210 included in the sensor 20 is faulty based on the first error detection result and the second error detection result.

Here, the electronic control device 10 may receive the raw data from the sensor 20 and obtain the second error detection result by performing the second error detection logic on the raw data, thereby determining whether the sensor channel 210 is faulty or malfunctions.

The transceiver 310 may receive, from the sensor 20, the raw data and the first error detection result obtained by performing the first error detection logic on the raw data.

A specific description is given below with reference to FIG. 4.

Figure 4:
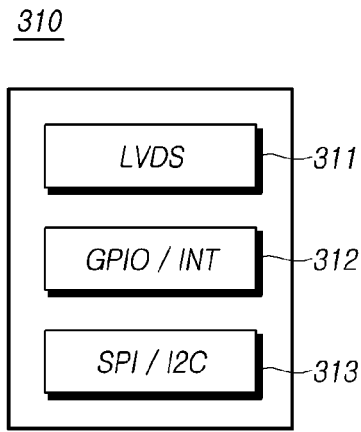
FIG. 4 is a block diagram more specifically illustrating a receiver according to an embodiment.

FIG. 4 is a block diagram more specifically illustrating a transceiver 310 according to an embodiment.

Referring to FIG. 4, the transceiver 310 may include an LVDS 311, a GPIO/INT 312, and an SPI/I2C 313.

The electronic control device 10 and the sensor 20 may exchange data with each other through the LVDSs 230 and 311. Specifically, the LVDS 311 may receive raw data from the sensor 20 and transmit the raw data to the detector 320 so that a second error detection logic is performed on the raw data. In this case, the sensor 20 may transmit the raw data to the electronic control device 10 through the LVDS 230 included in the sensor 20. In other words, the raw data may be transmitted/received through the LVDSs 230 and 311 included in the electronic control device 10 and the sensor 20, respectively.

The GPIO/INT 312 may receive a signal indicating whether the sensor 20 has an error from the sensor 20. These signals may be received periodically or aperiodically. For example, the GPIO/INT 312 may receive a signal indicating whether the sensor 20 has an error every predetermined period, allowing the electronic control device 10 to determine the state of the sensor 20 as a normal state or an abnormal state. As another example, the GPIO/INT 312 may receive an error signal from the sensor 20 to allow the electronic control device 10 to determine the state of the sensor 20 as a normal or abnormal state only when the sensor 20 is in the abnormal state.

The GPIO/INT 312 may receive the first error detection result obtained by performing the first error detection logic on the raw data by the sensor 20. By receiving the first error detection result, the electronic control device 10 may determine whether there is an error for each channel of the sensor 20.

The SPI/I2C 313 may transmit setting information of the sensor 20, generated by the detector 320, to the sensor 20. Here, the setting information of the sensor 20 may include, but is not limited to, the detection cycle of the sensor 20, ON/OFF for each channel included in the sensor 20, and the detection radius of the sensor 20.

The SPI/I2C 313 may receive feedback information for the setting information of the sensor 20 transmitted to the sensor 20. The feedback information may include information for whether a setting is completed on each setting information of the sensor 20 or information for the current setting state of the sensor 20.

Referring back to FIG. 3, the detector 320 may receive the raw data from the transceiver 310 and may obtain the second error detection result by performing the second error detection logic on the raw data. The second error detection logic may be the same procedure as the first error detection logic performed by the processor 220 of the sensor 20 described above in connection with FIG. 2. In other words, the detector 320 may determine whether each channel included in the sensor 20 has an error by performing the second error detection logic on the raw data.

The detector 320 may include at least one core. In particular, if the at least one core includes a plurality of cores, at least one of the plurality of cores may include a lockstep core.

The detector 320 may transmit the second error detection result to the comparator 330 for the integrity of the raw data.

The comparator 330 may determine the integrity of the raw data based on the first error detection result and the second error detection result.

For example, if the first error detection result is Pass and the second error detection result is Pass, the comparator 330 may determine that the sensor channels 210 outputting the raw data are in the normal state.

For example, if the first error detection result is Fail and the second error detection result is Fail, the comparator 330 may determine that the sensor channels 210 outputting the raw data are in the abnormal state. The comparator 330 may determine that each sensor channel 210 is in the normal or abnormal state through Pass or Fail.

For example, if the first error detection result is Fail, and the second error detection result is Pass, the comparator 330 may transmit the first error detection result and the second error detection result to the detector 320. Upon receiving the first error detection result and the second error detection result, the detector 320 may perform a third error detection logic and determine whether the sensor channel 210 has an error based on the result of the third error detection logic.

The third error detection logic may be defined as determining whether a detection means is faulty for the process of the second error detection result determined by the detector 320.

For example, in the third error detection logic, at least one of whether an error in the second error detection logic occurs, whether the detection target data of the second error detection logic is included in the raw data, whether the transceiver 310 receiving the state of the sensor 20 is faulty, and whether the comparator 330 is faulty is set as an error detection basis.

The detector 320 may determine whether the second error detection logic itself has an error in performing the second error detection logic. In other words, the detector 320 may determine whether the second error detection result obtained by the second error detection logic is normally or abnormally obtained. For example, the detector 320 may determine whether there is an error in the data flow or process flow of the detector 320.

The detector 320 may determine whether the transceiver 310 receiving the state of the sensor 20 is faulty. Specifically, the transceiver 310 may receive the first error detection result obtained by the sensor 20 and determine whether the first error detection result has been received as a different result due to a failure in the transceiver 310. In other words, the detector 320 may determine whether the first error detection result has been properly received. The first error detection result may be received by the GPIO/INT 312.

The detector 320 may determine whether the detection target data of the second error detection logic is included in the raw data. Specifically, the detector 320 may receive raw data every preset period, perform the second error detection logic, and obtain the second error detection result. The detector 320 may determine whether the raw data, which is the target for the second error detection logic, is raw data latest received or raw data received therebefore. For example, the detector 320 may determine whether the second error detection logic is performed based on the raw data received in a first period or the second error detection logic is performed based on the raw data received in a second period. In a case where the result of the second error detection logic in the first period is Pass, and the result of the second error detection logic is Fail, the detector 320, if the second error detection result obtained by the detector 320 based on the raw data in the second period is Pass although it is supposed to be Fail, the detector 320 may whether the raw data, as the target for the second error detection logic, is raw data received in the first period as described above.

The detector 320 may determine whether the comparator 330 is faulty. Specifically, the comparator 330 which compares the first error detection result and the second error detection result may determine whether the first error detection result and the second error detection result are differently received or whether an error occurs in the compared logics. For example, it may determine whether the first error detection result is received as Fail although it is Pass. As another example, it may determine whether the final result determined by the comparator 330 is obtained as Fail although the first error detection result is Pass and the second error detection result is Pass.

As described above, although the third error detection logic is described as an example, embodiments of the disclosure are not limited to a specific error detection logic as long as it is able to determine whether there is a transmission/reception error or comparison error in the raw data and the first error detection result and second error detection result.

As an example in which the comparator 330 determines the integrity of the raw data based on the first error detection result and the second error detection result, if the first error detection result is Pass and the second error detection result is Fail, the detector 320 may perform a fourth error detection logic.

The fourth error detection logic is another embodiment of the third error detection logic and may be defined as determining whether a detection means is faulty for the process of the second error detection result determined by the detector 320.

For example, in the fourth error detection logic, at least one of whether there is an error in the data path to the detector 320, whether the sensor 20 stops functioning or operating, whether the transceiver 310 receiving the state of the sensor 20 is faulty, and whether the comparator 330 is faulty is set as an error detection basis.

Whether the transceiver 310 receiving the state of the sensor 20 is faulty and whether the comparator 330 is faulty may be the same as the bases of the above-described third error detection logic.

The detector 320 may determine whether the sensor 20 stops functioning or operating. Specifically, the detector 320 may determine whether each component in the sensor 20 properly operates to transmit the raw data to the electronic control device 10. For example, the detector 320 may determine whether different data from the raw data output from the sensor channel 210 is transmitted due to an erroneous operation of the LVDS 230. As another example, the detector 320 may determine whether the raw data output from the sensor channel 210 is transmitted to a different path (e.g., the SPI/I2C 250), not the LVDS 230.

The detector 320 may determine whether there is an error in the data path from the sensor 20 to the detector 320. The data path may mean a path in which the sensor channel 210 outputs the raw data, the LVDS 230 of the sensor 230 receives the raw data and transmits the raw data to the electronic control device 10, and the LVDS 311 of the electronic control device 10 receives the raw data and transmits it to the detector 320. For example, the raw data may be damaged because it is not properly transmitted to the LVDS 230 of the sensor 20. In such a case, since the second error detection logic is performed based on the damaged raw data, the second error detection result may yield Fail.

If the first error detection result and the second error detection result differ from each other, the comparator 330 may perform the above-described third error detection logic or fourth error detection logic and may finally determine whether the sensor channel 210 is faulty according to the result of the third error detection logic or the fourth error detection logic. Typically, since the computation level of the electronic control device 10 is the automotive safety integrity level (ASIL) which is higher than the computation level of the sensor 20, the determination by the detector 320 may be prioritized over the determination by the sensor 20.

Figure 5:
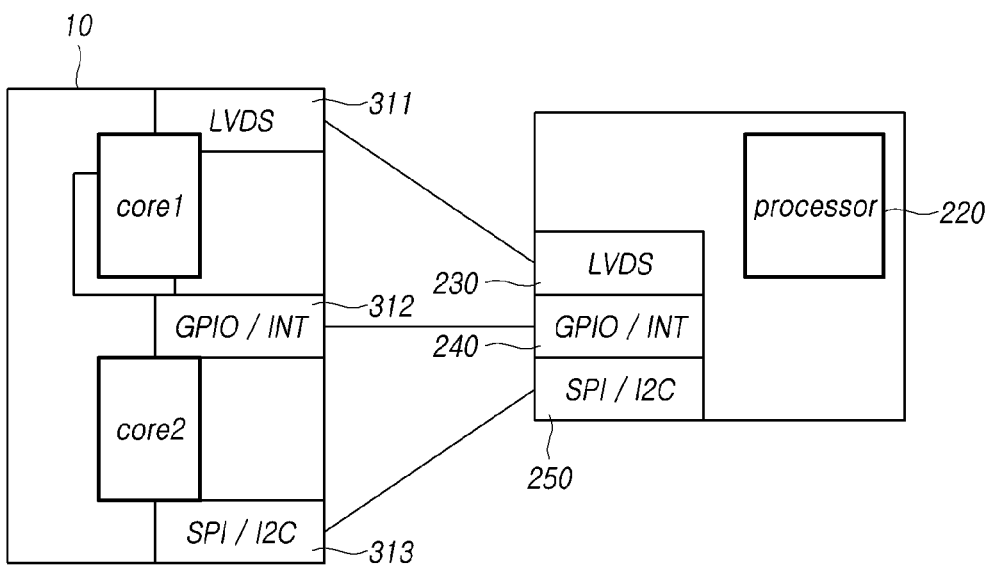
FIGS. 5 and 6 are views illustrating connection between a sensor and an electronic control device and data flows according to an embodiment.
Figure 6:
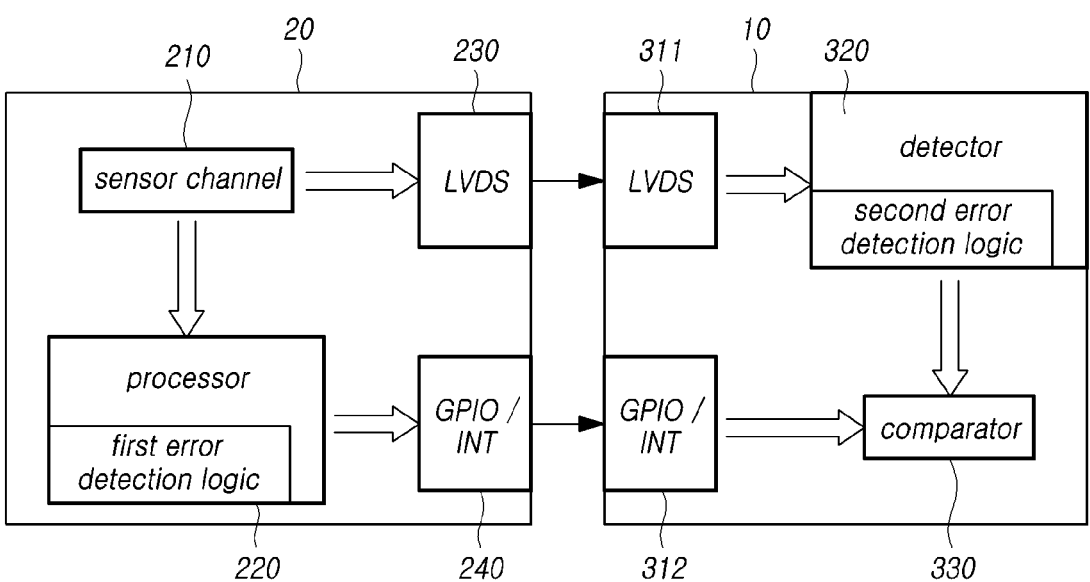

FIGS. 5 and 6 are views illustrating connection between a sensor 20 and an electronic control device 10 and data flows according to an embodiment.

Referring to FIG. 5, the LVDS 230 of the sensor 20 may be connected to the LVDS 311 of the electronic control device 10 to transmit raw data.

The GPIO/INT 240 of the sensor 20 may be connected to the GPIO/INT 312 of the electronic control device 10 to transmit whether the sensor 20 is faulty and a first error detection result.

The SPI/I2C 250 of the sensor 20 may be connected to the SPI/I2C 313 of the electronic control device 10 to transmit whether the sensor 20 is faulty and may transmit or receive each setting of the sensor 20.

Referring to FIG. 6, raw data generated as a detection result in the sensor channel 210 may be transmitted to the processor 220 of the raw sensor 20 and the LVDS 230 of the sensor 20. The raw data may be transmitted to the electronic control device 10 through the LVDS 230 of the sensor 20. The electronic control device 10 may receive the raw data through the LVDS 311 of the electronic control device 10.

The processor 220 may obtain a first error detection result by performing a first error detection logic based on the raw data. The first error detection result may be a result derived from the inside of the sensor 20. The processor 220 may transmit the obtained first error detection result to the electronic control device 10 through the GPIO/INT 240 of the sensor 20. The first error detection result may be received by the GPIO/INT 312 of the electronic control device 10.

The detector 320 may receive the raw data through the LVDS 311 of the electronic control device 10 and obtain a second error detection result by performing a second error detection logic based on the received raw data. The detector 320 may transmit the second error detection result to the comparator 330. In a case where the raw data is generated by a radar sensor 20, before the raw data is transmitted to the detector 320, the bit signal which is discretized by a signal processing unit (SPU) may be converted into a frequency domain, and the frequency and azimuth range may be determined by frequency analysis. In other words, the raw data may convert the radar signal into radar data by the SPU.

The first error detection result transmitted to the electronic control device 10 through the GPIO/INT 240 of the sensor 20 and the GPIO/INT 240 of the electronic control device 10 may be transmitted the comparator 330.

Finally, the comparator 330 may receive the first error detection result and the second error detection result, thereby determining whether the sensor channel 210 is faulty.

As described above, the electronic control device 10 according to the disclosure may perform error detection logic, once, on the raw data, thereby achieving the integrity of the raw data. Further, in a case where the first error detection result and the second error detection result are the same, the electronic control device 10 need not determine whether there is an error in, e.g., the data flow, process flow, or data transmission path of the detector 320, to obtain a basis for the second error detection result and, in this sense, the processing speed may be enhanced.

The electronic control device 10 of the disclosure may be implemented as an electronic control unit (ECU). The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/ or the storage unit. The memory and the storage unit may include various types of volatile/non-volatile storage media. For example, the memory may include a read only memory (ROM) and a random access memory (RAM).

The electronic control device 10 of the disclosure may be implemented as a microcontroller unit (MCU) included in the above-described ECU. The electronic control device 10 implemented as an MCU may have the same configuration and function as the above-described ECU.

Described below is an electronic control method using the electronic control device 10 capable of performing the above-described embodiments of the disclosure.

Figure 7:
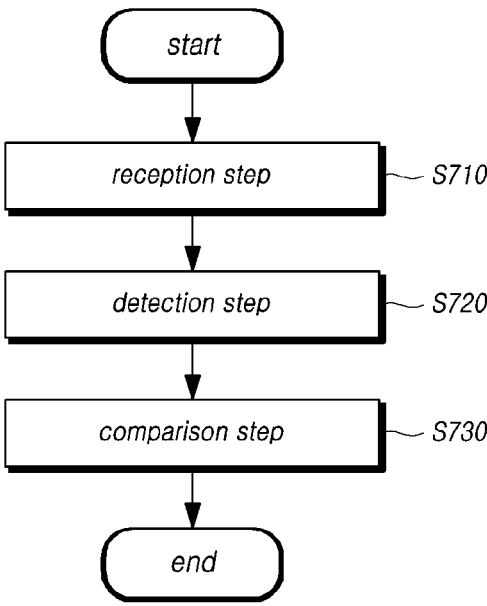
FIG. 7 is a flowchart illustrating an electronic control method according to an embodiment of the disclosure.

FIG. 7 is a flowchart illustrating an electronic control method according to an embodiment of the disclosure.

Referring to FIG. 7, according to the disclosure, an electronic control method may comprise a reception step (S710) receiving, from a sensor 20, raw data and a first error detection result obtained by performing a first error detection logic on the raw data, a detection step (S720) obtaining a second error detection result by performing a second error detection logic on the raw data, and a comparison step (S730) determining whether a sensor channel 210 included in the sensor 20 is faulty based on the first error detection result and the second error detection result.

The first error detection result may be a result of determining whether the sensor channel 210 has an error by the processor 220 included in the sensor 20.

The first error detection logic and the second error detection logic may be configured to yield an error detection result by the same error detection procedure.

The reception step S710 may receive whether the sensor channel 210 is faulty through a general purpose input output (GPIO)/INT signal.

Figure 8:
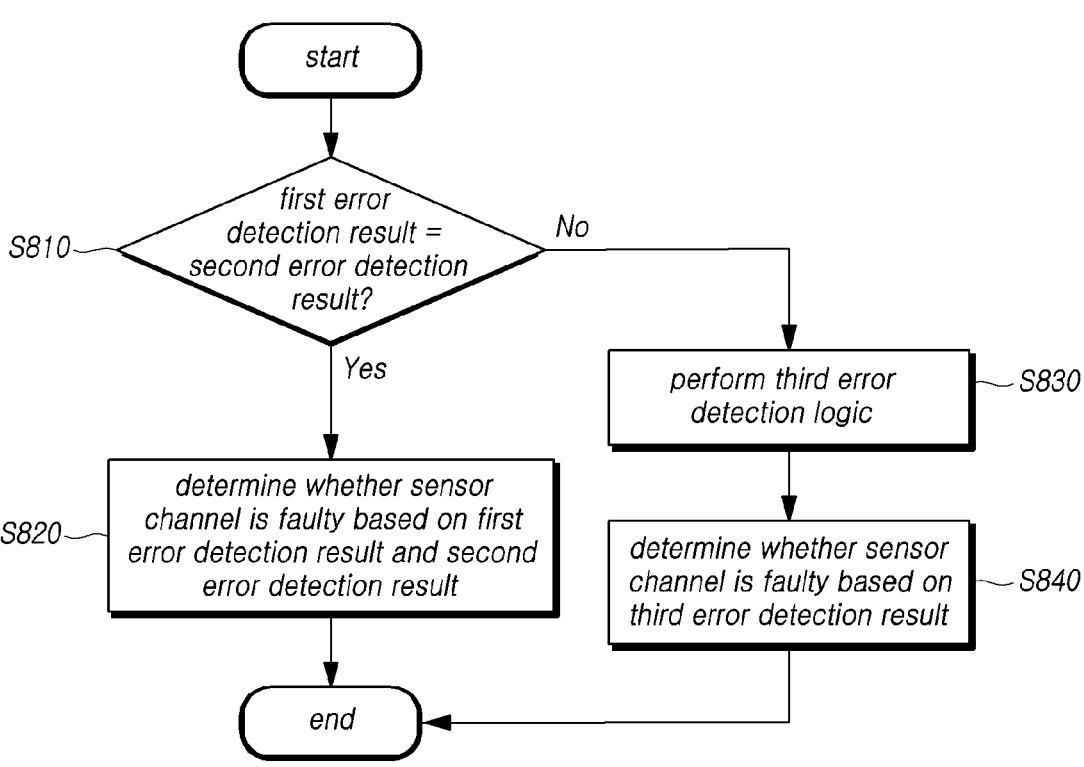
FIG. 8 is a flowchart more specifically illustrating step S730 according to an embodiment.

FIG. 8 is a flowchart more specifically illustrating step S730 according to an embodiment.

Referring to FIG. 8, the electronic control device 10 may determine whether the first error detection result and the second error detection result are the same (S810).

If the first error detection result and the second error detection result are the same (Yes in S810), the electronic control device 10 may determine whether the sensor channel 210 is faulty based on the first error detection result and the second error detection result (S820). For example, if the first error detection result and the second error detection result are Pass, the electronic control device 10 may determine that the sensor channel 210 is normal. As another example, if the first error detection result and the second error detection result are Fail, the electronic control device 10 may determine that the sensor channel 210 is faulty.

If the first error detection result is different from the second error detection result (No in S810), the electronic control device 10 may perform a third error detection logic (S830). In the third error detection logic, at least one of whether an error in the first error detection logic occurs, whether the detection target data of the second error detection logic is included in the raw data, whether the transceiver 310 receiving the state of the sensor 20 is faulty, and whether the comparator 330 is faulty is set as an error detection basis. The basis for error detection of the third error detection logic may increase the accuracy of error detection by adding a basis according to the processing speed of the electronic control device 10 or may enhance the processing speed of the electronic control device 10 by subtracting the basis.

The electronic control device 10 may determine whether the sensor channel 210 is faulty based on the third error detection result obtained by the third error detection logic (S840). For example, if the third error detection result is Pass, the electronic control device 10 may determine that the sensor channel 210 is normal. As another example, if the third error detection result is Fail, the electronic control device 10 may determine that the sensor channel 210 is faulty.

As described above, according to the disclosure, the electronic control device 10 and the method may enhance the integrity of raw data by determining whether the sensor channel 210 is faulty using each of the electronic control device and the sensor 20.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. An electronic control device, comprising:

a transceiver configured to receive, from a sensor, raw data and a first error detection result obtained by performing a first error detection logic on the raw data, the first error detection result including Pass and Fail;

a detector configured to obtain a second error detection result by performing a second error detection logic on the raw data, the second error detection result including Pass and Fail; and a comparator configured to determine whether a sensor channel included in the sensor is faulty based on the first error detection result and the second error detection result both including Pass and Fail received from the transceiver and the detector, respectively, wherein the first error detection result is a result of determining, by a processor included in the sensor, whether the sensor channel is faulty, wherein the comparator is configured to:

determine that the sensor channel is normal in response to the first error detection result being Pass and the second error detection result being Pass, and determine that the sensor channel is faulty in response to the first error detection result being Fail and the second error detection result being Fail, wherein the transceiver is configured to receive a general purpose input output (GPIO)/interrupt (INT) signal indicating whether the sensor channel is faulty, wherein in response to the first error detection result being Fail and the second error detection result being Pass, the detector is configured to perform a third error detection logic and determine whether the sensor channel is faulty based on the third error detection logic, wherein in the third error detection logic, whether an error in the first error detection logic occurs, whether detection target data of the second error detection logic is included in the raw data, whether the transceiver receiving a state of the sensor is faulty, and whether the comparator is faulty are set as an error detection basis.

2. The electronic control device of claim 1, wherein the first error detection logic and the second error detection logic are configured to yield an error detection result by a same error detection procedure.

3. The electronic control device of claim 1, wherein the transceiver includes a low voltage differential signaling (LVDS) circuit, a general purpose input output (GPIO)/ interrupt (INT) circuit, and a serial peripheral interface (SPI)/inter-integrated circuit (I2C).

4. The electronic control device of claim 3, wherein the GPIO/INT circuit receives a signal indicating whether the sensor has an error from the sensor.

5. The electronic control device of claim 4, wherein the GPIO/INT circuit receives an error signal from the sensor to allow the electronic control device to determine the state of the sensor as a normal state or an abnormal state only in response to the sensor being in the abnormal state.

6. The electronic control device of claim 3, wherein the SPI/I2C transmits setting information of the sensor, generated by the detector, to the sensor.

7. The electronic control device of claim 6, wherein the setting information of the sensor includes information on at least one of a detection cycle of the sensor, an ON/OFF for each channel included in the sensor, and a detection radius of the sensor.

8. The electronic control device of claim 3, wherein the SPI/I2C receive feedback information for setting information of the sensor, and wherein the feedback information includes information for whether a setting is completed on each setting information of the sensor or information for a current setting state of the sensor.

9. An electronic control method, comprising:

receiving, from a sensor, raw data and a first error detection result obtained by performing a first error detection logic on the raw data, the first error detection result including Pass and Fail;

obtaining a second error detection result by performing a second error detection logic on the raw data, the second error detection result including Pass and Fail;

determining whether a sensor channel included in the sensor is faulty based on the first error detection result including Pass and Fail and the second error detection result including Pass and Fail; and performing a third error detection logic in response to the first error detection result being Fail and the second error detection result being Pass, wherein the determining whether the sensor channel is faulty is determining whether the sensor channel is faulty based on the third error detection logic, wherein the first error detection result is a result of determining, by a processor included in the sensor, whether the sensor channel is faulty, wherein the determining whether the sensor channel is faulty is:

determining that the sensor channel is normal in response to the first error detection result being Pass and the second error detection result being Pass, and determining that the sensor channel is faulty in response to the first error detection result being Fail and the second error detection result being Fail, wherein the receiving raw data and a first error detection result is receiving a general purpose input output (GPIO)/interrupt (INT) signal indicating whether the sensor channel is faulty, and wherein in the third error detection logic, whether an error in the first error detection logic occurs, whether detection target data of the second error detection logic is included in the raw data, whether the transceiver receiving a state of the sensor is faulty, and whether the comparator is faulty are set as an error detection basis.

10. The electronic control method of claim 9, wherein the first error detection logic and the second error detection logic are configured to yield an error detection result by a same error detection procedure.

11. An electronic control system, comprising:

a sensor configured to perform a first error detection logic on raw data, which is a result of sensing, to obtain a first error detection result, the first error detection result including Pass and Fail; and an electronic control device configured to receive the raw data and the first error detection result, perform a second error detection logic on the raw data to obtain a second error detection result, the second error detection result including Pass and Fail, and determine whether a sensor channel included in the sensor is faulty based on the first error detection result including Pass and Fail and the second error detection result including Pass and Fail, wherein the first error detection result is a result of determining, by a processor included in the sensor, whether the sensor channel is faulty, wherein the electronic control device is configured to:

determine that the sensor channel is normal in response to the first error detection result being Pass and the second error detection result being Pass, and determine that the sensor channel is faulty in response to the first error detection result being Fail and the second error detection result being Fail, wherein the electronic control device is configured to receive a general purpose input output (GPIO)/interrupt (INT) signal indicating whether the sensor channel is faulty, wherein the electronic control device is configured to perform a third error detection logic and determine whether the sensor channel is faulty based on the third error detection logic, in response to the first error detection result being Fail and the second error detection result being Pass, and wherein in the third error detection logic, whether an error in the first error detection logic occurs, whether detection target data of the second error detection logic is included in the raw data, whether the transceiver receiving a state of the sensor is faulty, and whether the comparator is faulty are set as an error detection basis.

12. The electronic control system of claim 11, wherein the first error detection logic and the second error detection logic are configured to yield an error detection result by a same error detection procedure.

13. The electronic control system of claim 11, wherein the electronic control device includes a low voltage differential signaling (LVDS) circuit, a general purpose input output (GPIO)/interrupt (INT) circuit, and a serial peripheral interface (SPI)/inter-integrated circuit (I2C).

14. The electronic control system of claim 13, wherein the GPIO/INT circuit receives a signal indicating whether the sensor has an error from the sensor.

15. The electronic control system of claim 14, wherein the GPIO/INT circuit receives an error signal from the sensor to allow the electronic control device to determine the state of the sensor as a normal state or an abnormal state only in response to the sensor being in the abnormal state.

16. The electronic control system of claim 13, wherein the SPI/I2C transmits setting information of the sensor, generated by the detector, to the sensor.

17. The electronic control system of claim 16, wherein the setting information of the sensor includes information on at least one of a detection cycle of the sensor, an ON/OFF for each channel included in the sensor, and a detection radius of the sensor.

18. The electronic control system of claim 13, wherein the SPI/I2C receive feedback information for setting information of the sensor, wherein the feedback information includes information for whether a setting is completed on each setting information of the sensor or information for a current setting state of the sensor.

\* \* \* \* \*